E. G. DOLAND.
BOB SLED AND BRAKE THEREFOR.
APPLICATION FILED APR. 8, 1908.
901,790.
Patented Oct. 20, 1908.
2 SHEETS—SHEET 1.
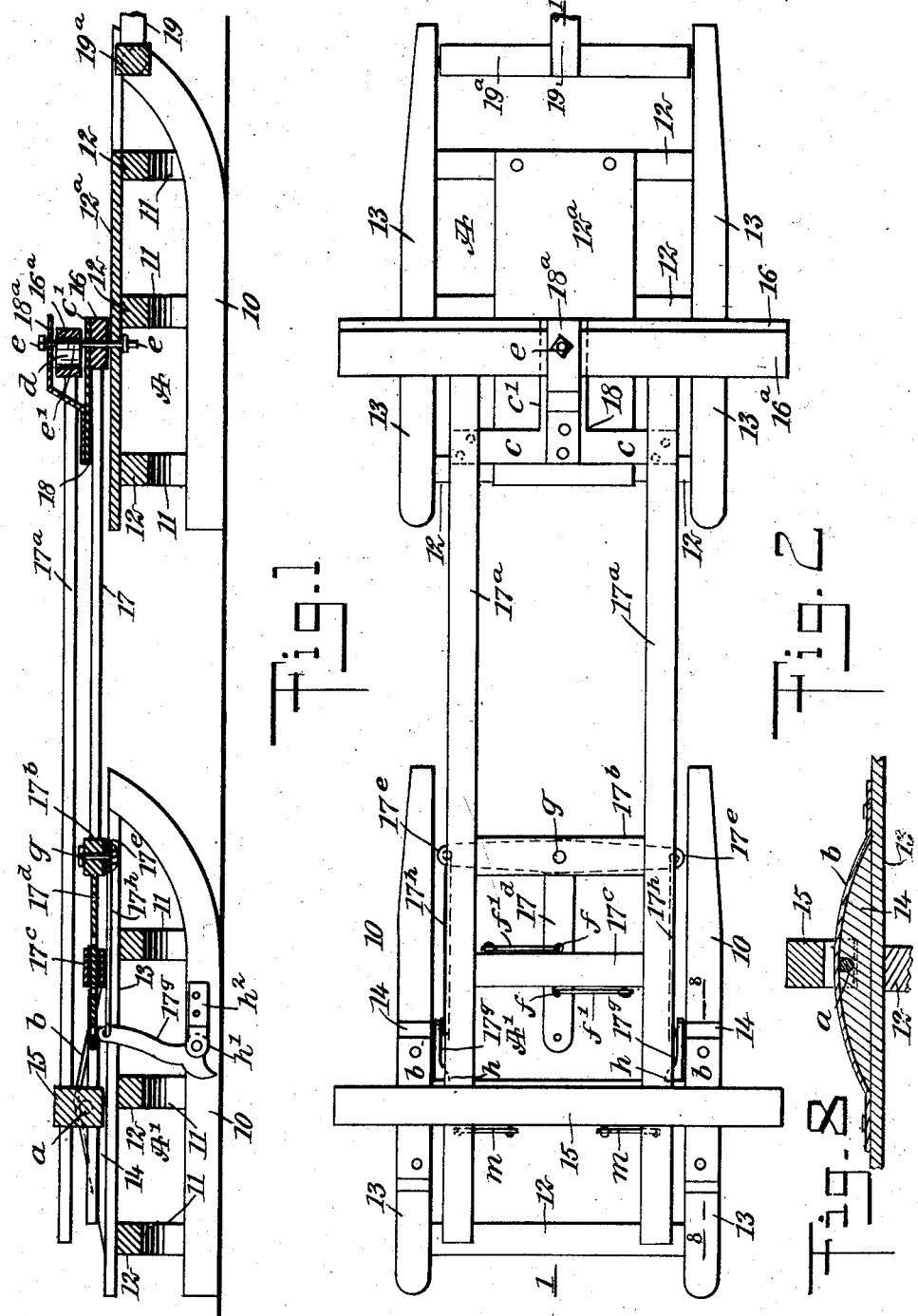
WITNESSES
INVENTOR
Eben G. Doland
BY Munn & Co.
ATTORNEYS

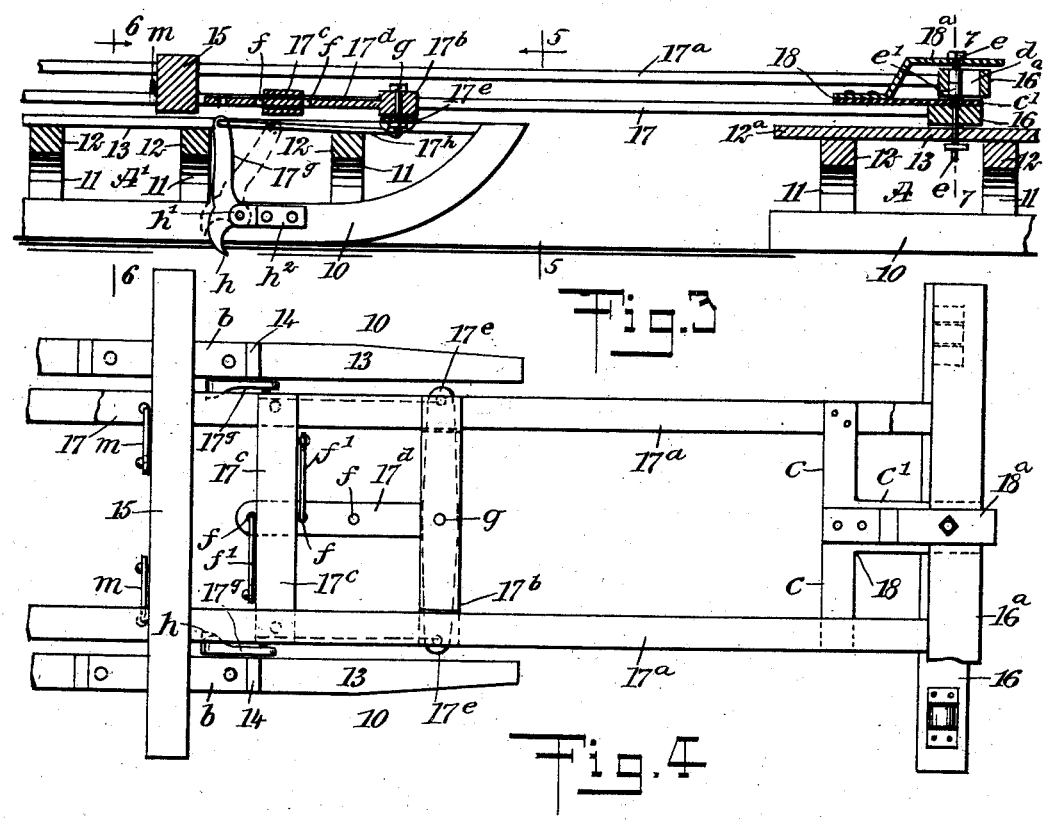

UNITED STATES PATENT OFFICE.

EBEN G. DOLAND, OF STARKSBORO, VERMONT.

BOB-SLED AND BRAKE THEREFOR.

No. 901,790.  Specification of Letters Patent.  Patented Oct. 20, 1908.

Application filed April 8, 1908. Serial No. 425,923.

*To all whom it may concern:*

Be it known that I, EBEN G. DOLAND, a citizen of the United States, and a resident of Starksboro, in the county of Addison and State of Vermont, have invented new and useful features of Improvement for a Bob-Sled and Brake Therefor, of which the following is a full, clear, and exact description.

This invention relates to a class of sleds comprising two connected sections known as bob sleds, and has for its object, to provide novel details of construction for a bob sled which will effect a positive action for setting a brake, upon relaxing draft strain, or causing the draft animals to hold back the front "bob" of the sled.

The invention consists in the novel construction and combination of parts as is hereinafter described, and defined in the appended claims.

Reference is to be had to the accompanying drawings forming a part of this specification in which similar characters of reference indicate corresponding parts in all the views.

Figure 1 is a sectional side view of the improved bob sled and brake thereon, the section being taken substantially on the line 1—1 in Fig. 2, showing the brake released by a forward pull on the sled; Fig. 2 is a plan view of the sled adjusted as represented in Fig. 1; Fig. 3 is a sectional side view showing the brake set for retarding the forward movement of the bob-sled, the front bob being broken away forwardly; Fig. 4 is a plan view of the sled having the brake adjusted for its continuous retraction, the front portion of the front bob being removed; Fig. 5 is a transverse sectional view substantially on the line 5—5 in Fig. 3, seen in direction of an adjacent arrow; Fig. 6 is a transverse sectional view substantially on the line 6—6 in Fig. 3; Fig. 7 is an enlarged transverse sectional view, substantially on the line 7—7 in Fig. 3; and Fig. 8 is a longitudinal sectional view substantially on the line 8—8 in Fig. 2.

A front bob sled A and rear bob sled A' of substantially similar form and size, when connected together constitute a main sled for hauling heavy freight.

Each bob sled is made up of two runners 10, 10, a plurality of upright knees 11, arranged at equal distances apart on the pair of runners, cross bars 12, mounted on the knees, and on the ends of the cross bars a cap piece 13 is mounted and secured above each runner. On each cap piece for the rear bob sled a reinforce block 14 is secured longitudinally thereof, these reinforce blocks at their centers having a transverse recess formed in each, of an equal depth, the bottoms thereof being concaved. Upon the reinforce blocks 14 a rear bolster bar 15 is mounted, said bar at a suitable equal distance from each end thereof, having a transverse slot therein, and across each of said slots flush with the lower side of the bolster, a cylindrical roller bearing $a$, is secured, which seats on the concave bottom of a respective transverse slot into which the roller is introduced. Through the slots mentioned, and over each roller bearing $a$, a keeper plate $b$ is passed and secured, these plates loosely holding the bolster bar 15 on the reinforce blocks 14, so that the bolster may rock laterally but be prevented from displacement. Upon the cross bars 12, for the front bob sled A, at their centers, a wear plate $12^a$ is mounted and secured, said plate affording a base piece whereon is mounted a forward transverse bolster 16. From the bolster 16, two parallel slide bars 17, extend rearwardly, the front ends of said slide bars being fixed in mortises in the bolster 16 and their rear end portions having slidable engagement within mortises in the rear bolster bar 15. A twin bolster bar $16^a$, is mounted upon the bolster bar 16 and is rigidly connected with the rear bolster bar 15 by two reach bars $17^a$. A three limbed yoke plate 18 is mounted at the ends of its laterally extending limbs $c$, $c$, upon the slide bars 17 near the front bolster bar 16, and centrally from said limbs the remaining member $c'$ of the yoke plate 18, is extended forwardly and secured upon said bolster bar 16. A clevis plate $18^a$ is secured at its rear upon the yoke plate 18 and thence it extends upward and forward affording a front member therefor which bears loosely upon the twin bolster $16^a$. At its center a transverse vertical slot $d$ is formed in the twin bolster bar $16^a$ and opposite said slot alined perforations are formed in the limb $c'$ and front member of the clevis plate $18^a$. A coupling bolt $e$ having a head on its upper end is inserted down through the perforations in the clevis plate and member $c'$ of the yoke plate 18, and the slot $d$, and as shown in Figs. 1 and 3, two similar rollers $e'$ are loosely mounted upon the coupling bolt and occupy the slot $d$ in the twin bolster bar $16^a$, said coupling bolt being loosely secured in place by a nut on its lower end. To reduce friction between the lower bolster bar 16 and the twin bolster bar 16ª, a pair of rollers $i$ are pivoted in suitable frames $i'$, and the latter are embedded in recesses formed in the upper side of the bolster bar 16, near its ends, and said rollers that project slightly above the upper surface of the bolster bar they are placed in, receive the impingement of the twin bolster bar, and prevent undue friction between the bars, this construction being shown clearly in Fig. 7. Forward of and a suitable distance from the rear ends of the slide bars 17 a transverse spacing bar 17ᶜ is mounted and secured thereon. A cross bar 17ᵇ is loosely mounted at its ends on the slide bars 17 and is positioned forward of the spacing bar 17ᶜ. From the center and rear edge of the cross bar 17ᵇ a flat bodied arm 17ᵈ is rearwardly extended, and passes loosely through a corresponding mortise formed in the spacing bar 17ᶜ. Upon the lower side of the slidable cross bar 17ᵇ a coupling bar 17ᵉ is centrally secured thereto, as shown at $g$ in Fig. 5.

From the ends of the coupling bar 17ᵉ that are disposed near to the runners 10 on the rear bob-sled, link rods 17ʰ are rearwardly extended and loosely secured upon the upper ends of two brake levers 17ᵍ. Each of the similar brake-levers 17ᵍ is in the form of a flat bar, having a curved toe $h$ formed or secured on the lower end thereof, and adjacent to said toe having a lateral ear $h'$ that is engaged by an ear that laps thereon and is an offset member of a bracket-plate $h^2$, which is secured on the inner side surface of a respective runner 10.

In the flat bodied arm 17ᵈ a plurality of spaced perforations $f$ are formed, as shown in Figs. 2 and 3, and on the front and rear sides of the spacing bar 17ᶜ a hook $f'$ is pivoted on each side, which hooks may be hooked into a pair of perforations near the cross-bar 17ᵇ, as shown in Fig. 2, or into another pair nearer the free end of the arm 17ᶜ, as represented in Fig. 3, and it will be seen that the hooked connection of this arm with the cross-bar 17ᵈ will adapt the reciprocation of the slide-bars 17 to raise or lower the sharp toes $h$ of the brake-levers 17ᵍ correspondingly.

A draft-pole 19 is secured at its rear end on a rockable cross-arm 19ª, that at its ends is pivoted between the forward ends of the runners 10 on the front bob-sled, said pole, that is shown broken away, in completed condition serving as means for connecting a team of draft animals with the sled.

In operation, it will be seen that a pull on the front bob-sled will slide the coupling-bolt $e$ and rollers $e'$ thereon forwardly in the slot $d$, which will pull the slide-bars 17 an equal degree forward. This will correspondingly move the links 17ʰ forward, and rock the toes $h$ upward and above the lower faces of the runners 10, and thus prevent them from impingement upon the road-bed, this being the normal condition of the brake.

When the sled, complete, is moving down a grade on the road, and it is necessary to check the speed of downward movement, the act of holding back the draft animals will correspondingly check the forward movement of the front bob-sled. This will permit the rear bob-sled to advance and push the twin or top bolster bar 16ª forward the length of the slot $d$ therein. The slide-bars 17 will in effect move rearwardly correspondingly, and the coupling-bar 17ᵉ will be adapted to push the link rods 17ʰ rearward, which in turn rocks the upper ends of the brake-levers 17ᵍ rearwardly, thus depressing the sharp toes $h$ thereon below the runners and into the road-bed, for retarding or complete arrest of the progressive movement of the sled.

It will also be evident that the backward movement of the draft animals at any time, whether on a level or inclined roadbed, will set the brakes and so retard or stop the sled.

It should be explained that for an effective operation of the brakes, the hooks $f'$ should be hooked into the perforations $f$ in the arm 17ᵈ that are nearest to the cross-bar 17ᵇ, but if the brakes are to be prevented from acting there will be no depression of the toes $h$ below the runners of the rear bob-sled, if the hooks $f'$ are hooked into perforations $f$ that are nearest to the free rear end of the arm 17ᵈ.

As a further means for preventing the operation of the brakes, two hooks $m$ are mounted upon the rear side of the rear bolster 15 and have their hook-noses extended toward the rear portions of the slide-bars 17, wherein perforations are formed, that said hook-noses may be inserted into, which will lock the slide-bars fast to the bolster-bar 15 and thus prevent a rocking action of the brake-levers 17ᵍ.

The provision of the rollers on the coupling bolt $e$ and their location in the slot $d$ greatly reduces friction due to a turning movement of the front bob-sled toward either side. The bolt $e$ working along with the rollers thereon permits a rocking movement of the top bolster 16ª on the lower one, considered longitudinally of the front bob-sled, and this adapts said front bob-sled to travel freely over an undulating road-bed and avoid strain of its connections with the rear bob-sled. It will also be noted that the provision of the roller bearings $a$ on the rear bolster 15 between said bolster and the reinforce-blocks 14, permits the rear bob-sled to rock freely from a horizontal position, and thus accommodate itself to travel over ruts, hills and hollows on and in a road-bed.

The connections between the two bob-sleds, while strong, are so arranged that the vehicle complete may be turned to either side in a small curve, and all working parts operate effectively under all conditions of service.

Having thus described my invention, I claim as new and desire to secure by Letters Patent:

1. The combination with two bob-sleds arranged in sequence, of two bolster-bars pivoted together and upon the front bob-sled, one bolster-bar being slidable on the other one, two brake-levers having depending toes and pivoted on the runners of the rear bob-sled, and means for connecting the sliding bolster-bar with the brake-levers for rocking them in unison.

2. The combination with two bob-sleds arranged in sequence, of two bolster-bars pivoted together and upon the front bob-sled, the top bolster-bar having a transverse slot and the pivot occupying said slot, rollers on said bolt working in the slot, two brake-levers pivoted on the runners of the rear bob-sled, and means connecting the sliding bolster with the brake-levers and rocking them in unison.

3. The combination with the two bob sleds arranged in sequence, of a pair of bolster bars pivoted together and to the front bob sled, said upper bolster bar having a lost motion connection with the lower bar, brake levers pivoted on the runners of the rear bob sled, a pair of sliding plates extending from the lower bolster bar and having a connection with the brake levers, and plates extending from the upper bolster bar to a connection with the rear bob sled.

4. The combination with the two bob sleds arranged in sequence, of two bolster bars pivoted one upon the other and to the front bob sled, the upper bolster bar having a lost motion connection with the lower bar and with the front sled, a bolster bar on the rear bob sled, brake levers on the runners of the rear bob sled, plates connected with the lower bolster bar and with the brake levers, and plates connected with the upper bolster bar, and having a connection with the lower bolster bar.

5. The combination with two bob sleds arranged in sequence, of reinforce blocks mounted on the frame of the rear sled above the runners, said blocks each having a transverse recess, the recesses having a concave bottom, a bolster bar having transverse slots, rollers journaled in the bottoms of the slots, said rollers seating in the recesses.

In testimony whereof I have signed my name to this specification in the presence of two subscribing witnesses.

EBEN G. DOLAND.

Witnesses:
WILLIAM B. ELLISON,
ELMER E. STOKES.